Patented Oct. 8, 1929

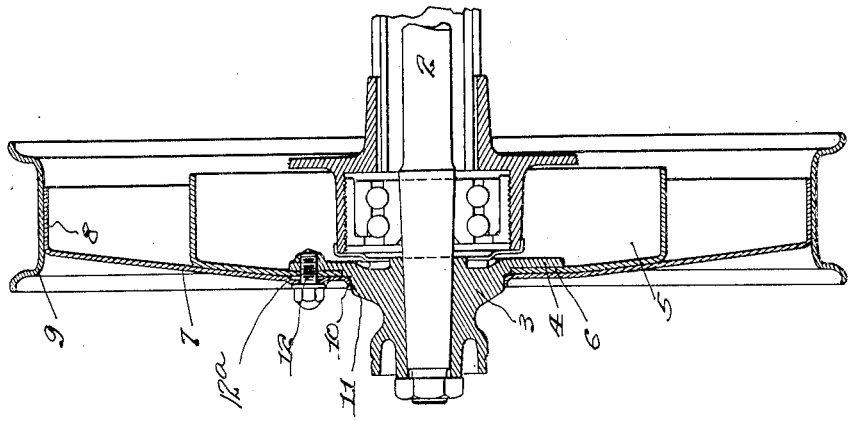
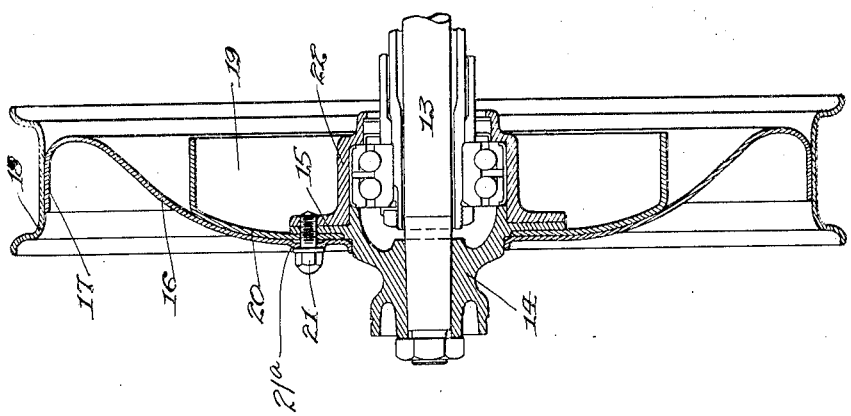
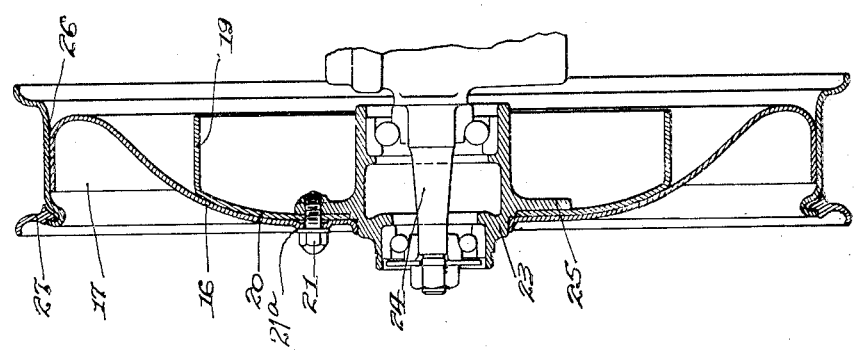

1,730,872

UNITED STATES PATENT OFFICE

ERLE K. BAKER, OF DETROIT, MICHIGAN

AUTOMOBILE WHEEL

Application filed December 23, 1922. Serial No. 608,614.

My invention relates generally to improvements in automobile wheels, but relates more particularly to improvements in disc wheels.

The general object of my invention is to simplify the construction of such wheels and to reduce the cost thereof.

Another object of my invention is to decrease the weight of the wheel structure without decreasing the strength thereof.

I aim also to provide an improved disc wheel which can be used with the various types of axle constructions and wherein the shape of the disc can be any that may be desired.

My invention consists generally in a wheel, of the form, construction and disposition of the parts, whereby the above named objects, together with others that will appear hereinafter, are attainable; and my invention will be more readily understood by reference to the accompanying drawings which illustrate what I consider, at the present time, to be the preferred embodiment thereof.

In said drawings:

Fig. 1 is a vertical sectional view showing my improved wheel as mounted upon the rear or driving axle of the live axle type.

Fig. 2 is a sectional view of a modified wheel type embodying my invention and being mounted upon the rear axle of the floating type; and Fig. 3 is a sectional view illustrating a wheel of the type shown in Fig. 2 but mounted upon a front or steering wheel spindle.

In automobile practice the rear wheels are generally subjected to more severe usage than are the front wheels, inasmuch as they usually are called upon to carry considerably more weight, and at the same time are subjected to the driving strains which are not imposed upon front wheels. In some instances, rear wheels are made of a heavier construction than the front wheels, but under the demountable wheel practice this would be an objection because the wheels could not be freely interchanged. This would necessitate the carrying of extra wheels. I have provided a construction in which, if desired, the wheels, when in use upon the rear or driving axle, shall be reinforced or strengthened by a necessary part of the rear axle assembly. The construction I have devised is also such that it can be used for front wheel purposes when desired.

Referring now to the drawings for the details of construction and particularly to Fig. 1 thereof, 2, represents a live driving axle at the outer end of which is mounted an element 3 which, for the sake of a convenient term will be called a hub or hub member. The hub member 3 is provided with an annular flange 4. In the present construction the brake drum 5 is positioned with the radial face portion 6 thereof upon the outer side of the flange 4. The wheel disc 7, in this instance, is substantially conical in form and terminates, at its outer end, in a ring-like portion 8 upon which there is mounted a tire containing rim 9. The tire containing rim 9, in the present instance, is provided with integral side flanges and is of the straight side type, but this should be considered as by way of illustration and not by way of limitation.

The conical disc 7 terminates inwardly in a ring-like portion 10 which provides an opening of sufficient size to permit the disc to be slipped axially on the cylindrical seat portion 11 of the hub 3 and adjacent said ring like portion I provide one or more ring like embossments 12$^a$. I form the face portion 6 of the brake drum so that it conforms to the shape of the disc 7. Thus when the disc 7 is drawn home, as by means of the bolts 12 that pass through the apertured embossments 12$^a$ and enter suitable tapped openings in the hub flange 4, the disc 7 and the face 6 of the brake drum are held in contact. Therefore, the brake drum serves to reinforce or strengthen the disc 7 toward the center thereof, at which place additional strength is necessary. This permits of the disc 7 to be of relatively light weight stock and obviates the necessity of providing a disc that increases in thickness toward the center. That is to say, the disc 7 can be formed from stock of uniform thickness which very greatly simplifies and cheapens the stamping or pressing and other forming operations. The brake drum, being a necessary part of the automobile, obviously does not increase the unsprung weight. In other words, the brake drum is caused to serve an additional and valuable function. The disc 7 may be used alone for front wheel purposes where a lighter construction will suffice without the use of the brake drum, but if desired the brake drum construction may be likewise used for the front wheel. This construction will be later described with respect to the modification shown in Fig. 3. It should be understood that the wheel may be removed by removing the bolts 12 without disturbing the position of the brake drum upon its support. In other words, the disc wheel can be readily mounted and dismounted.

Referring now to the construction shown in Fig. 2, therein 13 represents the driving axle, and 14 the hub, which is mounted thereon. In this instance, the construction is of the floating type, but since such axle constructions are well known, it is not thought necessary to describe the same in detail. It is also for convenience in terminology that the member 14 will be referred to as the hub member. The hub member 14 is provided with a flange 15 which corresponds to the flange 4 of Fig. 1. In this instance, the disc wheel is provided with a body portion 16 which from the center outwardly curves upon an arc of relatively large radius merging toward the outer end or part in a reverse arc of relatively small radius and terminating in a ring-like portion 17 on which there is mounted a tire carrying rim 18. The tire carrying rim may be of any desired shape or construction.

The brake drum 19, in this instance, is likewise placed upon the outer side of the flange 15 and is provided with a portion 20 of curved shape that conforms to the curvature of the adjacent portion of the disc wheel. The disc wheel is drawn home by means of suitable bolts 21 that pass through one or more apertured embossments 12ª and enter tapped openings in the flange 15. The bolts may also be used to hold the bearing housing 22 in place, if this is desired. The advantages referred to when describing Fig. 1, are obviously present in the construction just described.

Referring now to Fig. 3 the construction is similar to that shown in Fig. 2 except that the hub 23 in this instance, is carried by the steering wheel spindle 24. The hub 23 is provided with a flange 25 upon which the brake drum, wheel and other parts are mounted, as in Fig. 2, and since they correspond thereto they have been given like reference characters.

The tire carrying rim 26, in this instance, is provided with a detachable side flange 27. While the construction shown in Fig. 3 shows a type of disc wheel like that shown in Fig. 2, it should be obvious that the type shown in Fig. 1, or other desired type, can likewise be used for front wheel purposes. The construction shown in Fig. 3 also enables the use of braking mechanism on the front wheels, if this is desired, so that the many advantages of the four wheel braking action can thereby be conveniently attained.

The many advantages of my invention will be apparent to those skilled in the art to which this appertains, without further comment.

I claim:—

1. In a wheel construction of the type described, a hub flange, a wheel disc having a gradually arched central portion concaved on its inner side mounted upon the outside of said hub flange in combination with a brake drum having a similarly arched end wall interposed between the wheel disc and hub flange and engaging substantially throughout its entire outer convexed area with the inner face of said central portion of the wheel disc to reinforce the same.

2. In a wheel construction of the type described, a hub flange, a wheel disc having a gradually arched central portion concaved on its inner face mounted upon the outside thereof, in combination with a brake drum having a similarly arched end wall interposed between the wheel disc and hub flange and engaging substantially throughout its entire area with the concaved inner face of said wheel disc to reinforce the same, and means for holding said cambered disc and end wall together and for securing the same to said flange.

3. In a wheel construction of the kind described, the combination of an outwardly cambered wheel disc, a rim secured to the peripheral part thereof, a brake drum having an end wall conformed to and engaged throughout its entire area with said disc, a hub member, and means for securing said disc and brake drum thereto, with said disc and brake drum arranged between the outer and inner planes of said rim.

In testimony whereof, I have hereunto set my hand, this 19th day of December, 1922.

ERLE K. BAKER.